Figure 1:
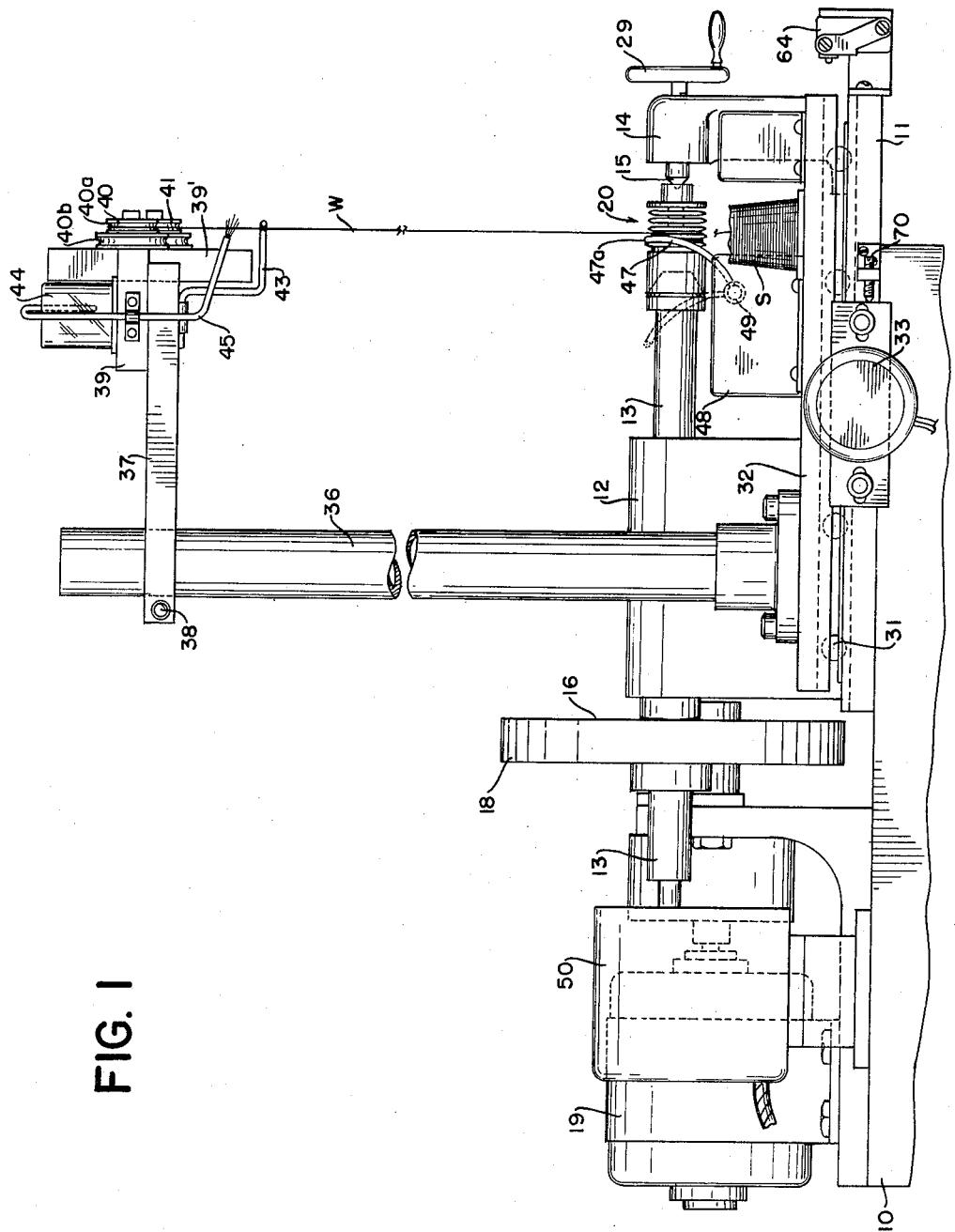

Sept. 1, 1964

C. S. DANIELS ETAL
COIL WINDING APPARATUS 3,146,963

Filed Aug. 4, 1959

4 Sheets-Sheet 1

INVENTORS
CHARLES S. DANIELS
RONALD G. NICHOLSON
BY
ATTORNEYS

Sept. 1, 1964  C. S. DANIELS ETAL  3,146,963
COIL WINDING APPARATUS
Filed Aug. 4, 1959  4 Sheets-Sheet 4
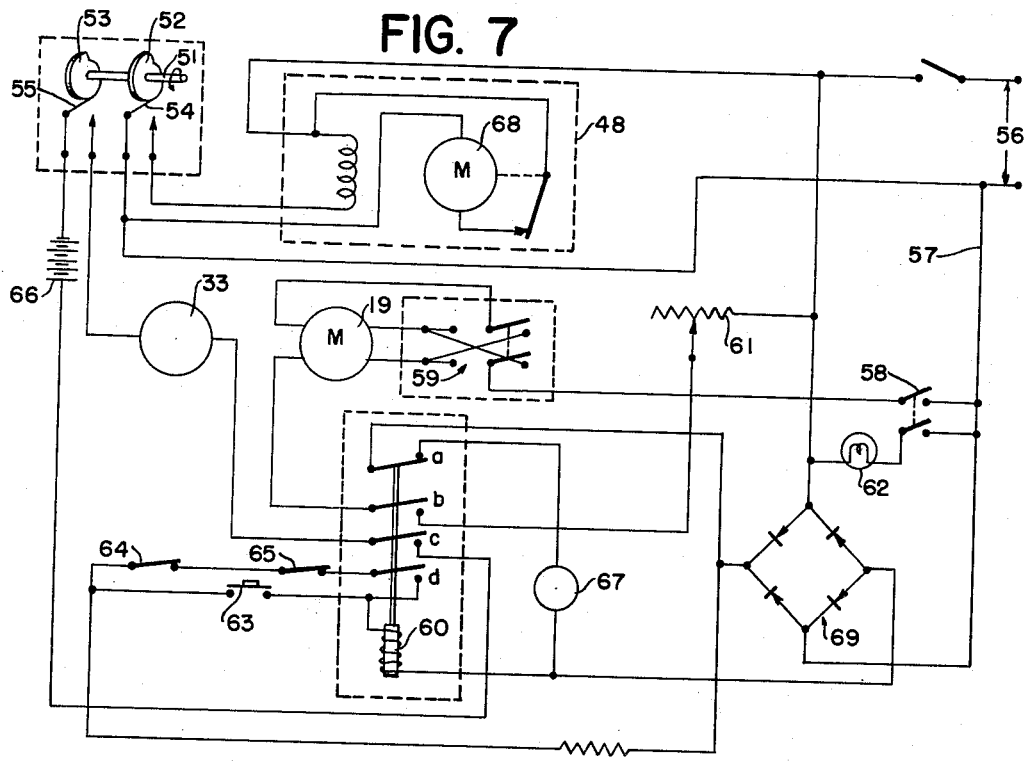
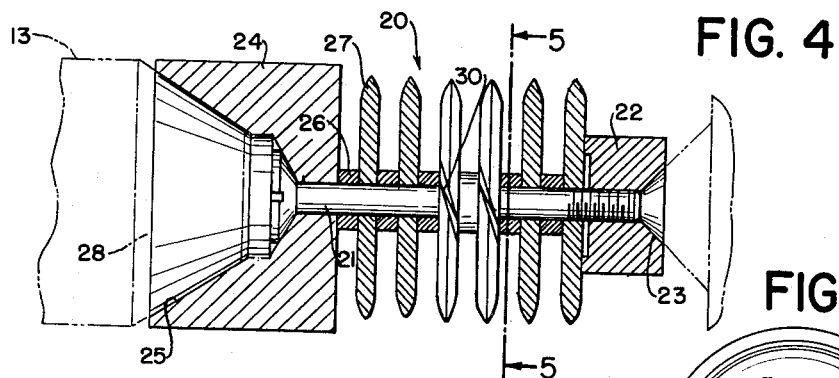
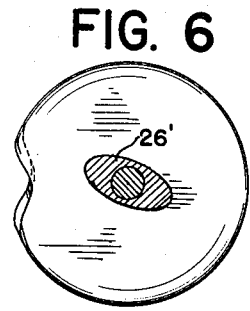
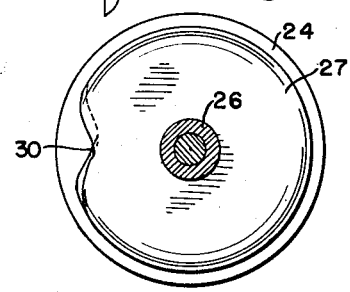
INVENTOR
CHARLES S. DANIELS
RONALD G. NICHOLSON
BY
ATTORNEYS United States Patent Office 3,146,963
Patented Sept. 1, 1964

3,146,963
COIL WINDING APPARATUS
Charles S. Daniels, Woodbury, and Ronald G. Nicholson, Thomaston, Conn., assignors to Consolidated Electronics Industries Corp., Waterbury, Conn., a corporation of Delaware
Filed Aug. 4, 1959, Ser. No. 831,662
6 Claims. (Cl. 242—9)

The present invention relates to apparatus for winding coils, and is directed more specifically to improved arrangements for winding successively a plurality of small coils formed of a number of turns of fine wire.

The winding of rotor coils of small electric motors, for example, is an operation requiring substantial delicacy and precision. As a result, it has been difficult, heretofore, to carry out such operations on a substantially automated basis, to achieve mass production economies. Thus, although a variety of machines have been developed for winding such coils, those machines of which the applicant is aware and which perform in a satisfactory manner, require substantial operator attention, since the machine must be stopped and reset or readjusted after the winding of each individual coil.

In accordance with the present invention, a novel, comprehensive and substantially automated coil winding apparatus is provided, whereby a plurality of coils may be wound in sequence, without the attention of an operator. Moreover, the foregoing production advantages are achieved in a manner which enables the coils to be wound with substantial precision, assuring that the output of the apparatus is of a high-quality nature.

In general, the new apparatus incorporates a rotating mandrel having associated therewith a movable wire guide. The wire guide is located a substantial distance from the mandrel, in relation to the width of the coils to be wound, and is arranged to be positioned directly over each of a plurality of successive coil spaces, defined by transfer discs mounted on the mandrel. After a predetermined number of turns have been wound in one coil space, the line guide is shifted relative to the mandrel a distance equal to one coil space and a transfer arm, located adjacent to the mandrel, is moved into an operative position, in which it forces the wire from the wound coil to the next successive coil space. The coil spaces are separated by transfer discs provided with inclined slots therein, so that the wire may transfer from one coil space to the next by passing through the slot in the disc. The arrangement of the apparatus, and the specific components thereof, is such that once the machine is properly set up, a plurality of coils may be wound successively with substantial precision, in an entirely automatic manner.

Figure 2:
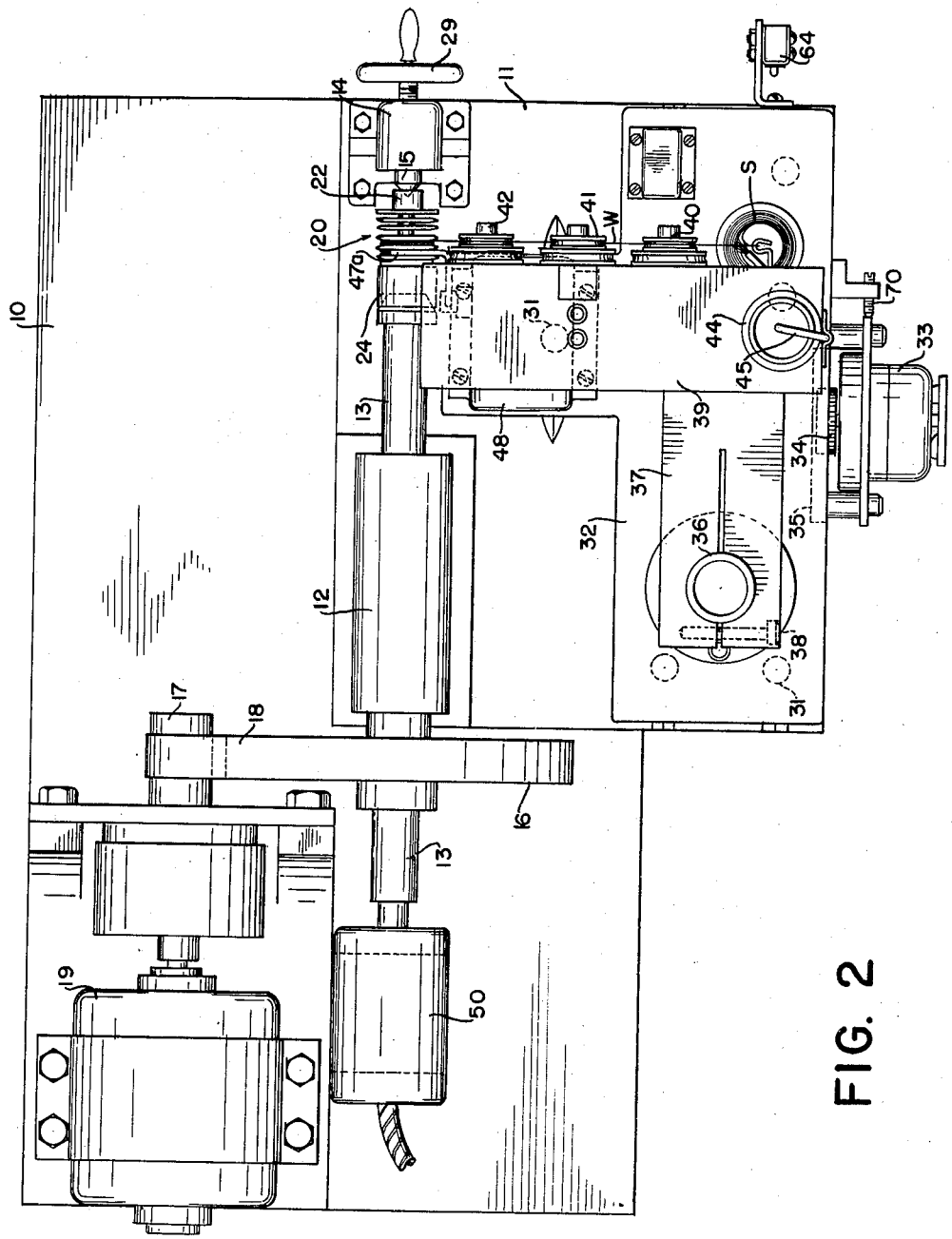
Figure 3:
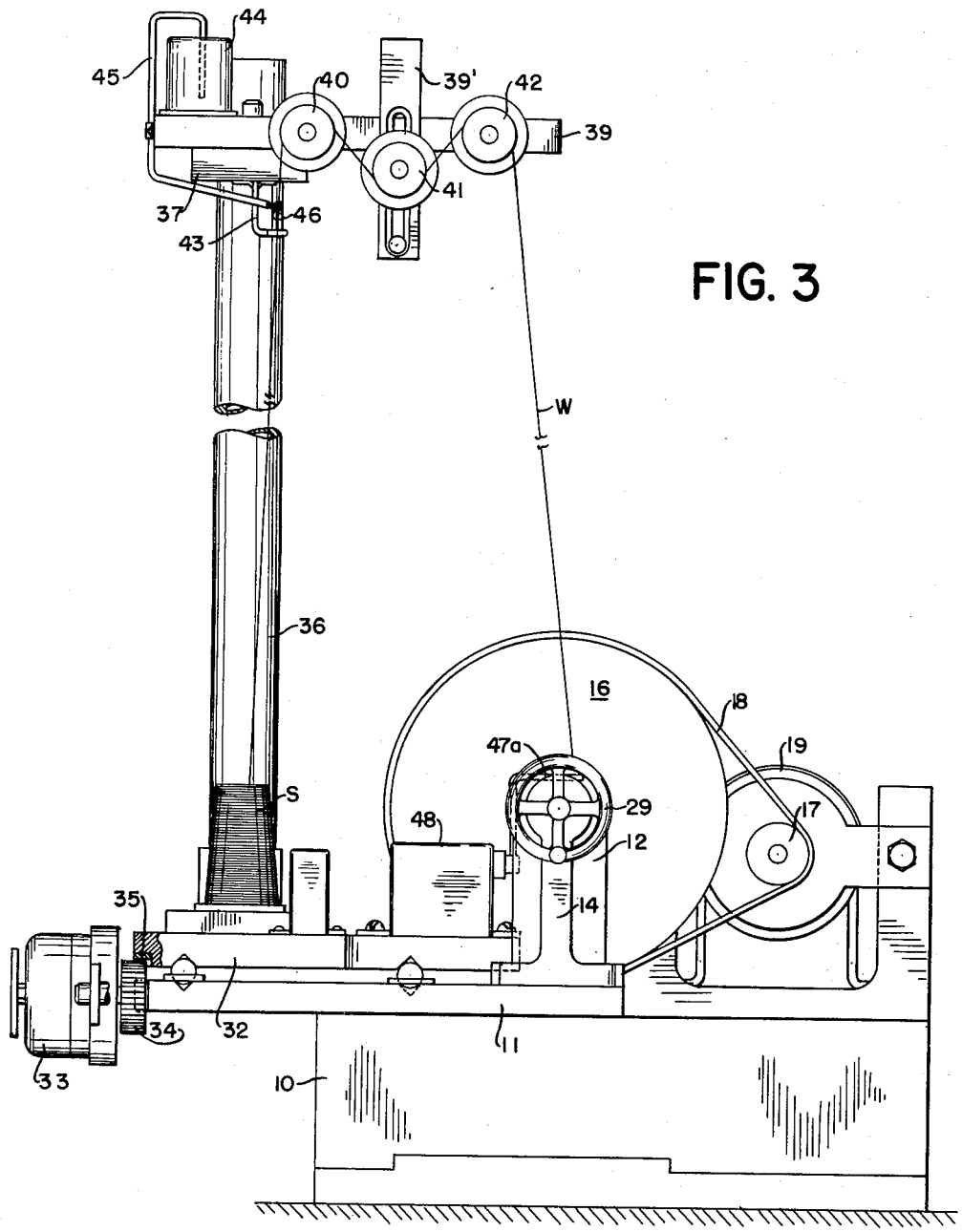

For a better understanding of the above and other advantageous features of the invention, reference should be made to the following detailed specification and to the accompanying drawings, in which:

FIG. 1 is an elevational view of a coil winding apparatus incorporating the features of the invention;
FIG. 2 is a top plan view of the apparatus of FIG. 1;
FIG. 3 is an end elevation of the apparatus of FIG. 1;
FIG. 4 is an enlarged, fragmentary, cross-sectional view of a coil winding mandrel incorporated in the new apparatus;
FIG. 5 is a cross-sectional view taken along line 5—5 of FIG. 4;
FIG. 6 is a cross-sectional view similar to FIG. 5, illustrating a different form of coil core; and
FIG. 7 is a simplified, schematic representation of an electrical control circuit forming part of the apparatus of FIG. 1.

Referring now to the drawings, and initially to FIGS. 1–3 thereof, the reference numeral 10 designates a base, at one end of which is mounted a plate 11. At one side of the plate there is mounted a journal 12, supporting a rotatable mandrel shaft 13, and aligned with the shaft but spaced from the end thereof is a bracket 14 mounting a live center 15. The mandrel shaft 13 is connected to a pulley 16 which, in turn, is driven by a pulley 17 and belt 18. The pulley 17 is fixed to the shaft of a motor 19 secured to the base 10.

Supported between the shaft 13 and live center 15 is an improved mandrel assembly, shown in detail in FIG. 4. Advantageously, the mandrel 20 comprises a central shaft 21, which may be in the form of an elongated bolt. The threaded end of the bolt engages an end piece 22 provided with a conical recess 23 in its outer end. The head end of the bolt engages a second end piece 24, which is also provided with an outwardly facing conical recess 25. Between the end pieces 22, 24 there are provided, alternately, coil cores 26 and transfer discs 27, the cores, discs and end pieces being held tightly together by the bolt 21 to form a rigid unit. The spaces between the transfer discs may be referred to as coil spaces since, as will be described, the successive coils are wound on the cores 26 in the spaces between the discs.

As indicated in FIG. 4, the outer end 28 of the mandrel shaft 13 is in the form of a truncated cone, of a size and shape to conform to the recess 25 of the left hand end piece 24, enabling the end piece to be gripped frictionally by the mandrel shaft. The exposed end of the live center 15 is likewise in the form of a cone, adapted to conform with the conical recess 23 of the right hand end member 22, whereby the mandrel may be aligned accurately with the mandrel shaft 13.

Advantageously, the mandrel assembly 20 is removable bodily from the apparatus and, to this end, either the shaft 13 or the live center 15 may be retractably mounted. In the illustrated apparatus, the live center 15 is movable axially by means of a handwheel 29 and, when the apparatus is completely assembled, the handwheel 29 is manipulated to advance the live center 15 toward the mandrel shaft, whereby the mandrel assembly is forced into tight, gripping engagement with the shaft for rotation therewith.

As illustrated best in FIGS. 4 and 5, the transfer discs 27, forming part of the mandrel assembly, are generally of circular outline and are provided at one or more points on their peripheries with inclined slots 30 extending from one side to the other side of the discs and to a depth such that the bottom of the slots lie radially outward of the maximum radius of any coil wound on the mandrel. Advantageously, the slots 30 are disposed at an angle of about 15° to the planes of the discs.

Mounted on the base plate 11, and supported for antifrictional movement by a plurality of rollers 31 is a traverse table 32. The traverse table 32 is guided for movement parallel to the mandrel shaft 13 and is connected to the base plate 11 by means of a rotary ratchet solenoid 33, which is mounted on the base plate 11 and engages the traverse table 32 through a pinion 34 and rack 35. The rotary solenoid 33 is of a conventional, commercially available type adapted, when actuated, to rotate its pinion 34 through a predetermined angle and drive the traverse table 32 through a predetermined linear distance. The solenoid device includes a suitable ratchet mechanism (not specifically shown) enabling the deenergized solenoid to return to its initial position without effecting movement of the traverse table.

Mounted at one end of the traverse table is a support 36, which extends upward a substantial distance above the mandrel shaft 13 and mounts a support arm 37. The arm 37 advantageously is secured to the support 36 by means of a clamping bolt 38, permitting vertical adjustment of the arm 37 toward and away from the mandrel shaft. The arm 37 includes a portion 39 extending horizontally, generally toward the mandrel shaft 13 and mounting a plurality of discs 40–42 forming a combined wire guide and tensioning device.

Directly below the disc 40, on the traverse table 32 is a wire supply S, from which a wire W extends through a guide loop 43, to the disc 40. The wire passes over the top of the disc 40, around the bottom of the disc 41 and over the top of the disc 42, the several discs being suitably grooved to receive the wire. After passing over the third disc 42, the wire extends downward and is secured to the mandrel assembly 20.

Advantageously, the middle disc 41 of the line guide and tensioning device is adjustably positioned below the centers of the discs 40, 42, a slotted bar 39' being provided for this purpose. Thus, by securing the disc 41 in different positions on the slotted bar 39', the wire W may be caused to contact the discs 40–42 over a variable linear extent, so that an accurately predetermined amount of frictional drag may be applied to the wire. Advantageously, the size and spacing of the discs 40–42 and the range of adjustment of the center disc 41, are such as to enable the surface contact between the wire and the discs to be varied between about 180° and 540°, measured in terms of total angle of contact over the three discs. This range of adjustment may be extended by providing the discs with two sets of grooves of different diameters, as indicated at 40a, 40b in FIG. 1.

If desired, a lubricating device may be utilized, so that the wire travelling from the supply S to the first disc 40 is uniformly conditioned. A suitable lubricating device may consist of a lubricant container 44, mounted on the support arm extension 39 and having associated therewith a capillary device 45 extending downward and having an end portion 46 in contact with the passing wire.

In accordance with one important feature of the invention, there is provided on the traverse table 32 a transfer arm 47 mounted for pivoting movement and operated by an actuator 48. In the illustrated apparatus, the transfer arm 47 is pivoted for movement about a horizontal axis 49 and has a portion 47a extending horizontally over the top of the mandrel assembly. The transfer arm 47 normally occupies the retracted position illustrated in broken lines in FIG. 1, but is movable upon energization of the actuator 48 into an operative position, shown in full lines, in which the active portion 47a lies directly over the mandrel assembly. As will be described in greater detail, following the completion of the winding of a coil the traverse table is moved relative to the mandrel assembly to align the guide and tension device with the next successive coil space. Simultaneously, the transfer arm 47 is actuated to its operative position, in which the active portion 47a of the arm moves over the top of the just completed coil, engaging the wire extending therefrom and urging it immediately to the next coil space. During the next turn of the mandrel, the wire passes through the slot 30 in the transfer disc, and the winding of the next successive coil is initiated.

Advantageously, the winding of a plurality of coils is carried out automatically, by effecting the desired movement of the traverse table and the transfer of the wire to successive coil spaces as each coil is completed. To this end, means are provided for counting the number of turns of each coil wound and for effecting the necessary transfer movements in accordance therewith. In the illustrated apparatus, counting of turns is effected by a gear reduction device 50 driven by the mandrel shaft 13 and arranged to drive a control device, such as a cam, through a single revolution during the winding on a coil of a predetermined number of turns. Thus, referring to FIG. 7, a shaft 51 is arranged to be rotated through one revolution during the winding of each complete coil on the mandrel assembly. The shaft 51 has mounted thereon a pair of cams 52, 53 cooperating with switches 54, 55, to effect the actuation of the switches at desired times in accordance with the operations of the mandrel shaft.

In the control circuit illustrated in FIG. 7, a supply source 56 is connected to the main drive motor 19 through a conductor 57, off-on switch 58, reversing switch 59, normally open contacts 60b of a relay 60 and a speed regulating variable resistor 61. The off-on switch 58 conditions the drive motor for operation and causes the readiness of the equipment to be indicated by the energization of a pilot lamp 62. When the switch 58 is closed, the motor 19 may be energized by closing a push button switch 63 to energize the relay 60. The relay locks in through a circuit including limit switches 64, 65 and contacts 60b of the relay. Energization of the relay 60 also effects the closure of contacts 60c thereof to complete a circuit including a battery 66 and the rotary indexing solenoid 33. The closing of the contacts 60c does not, however, effect the energization of the solenoid 33, as this occurs subsequently, upon the closure of the switch 55.

Energization of the relay 60 also effects the opening of contacts 60a, to deenergize a brake solenoid 67, which is associated with the motor 19 and is effective, when energized, to stop the main drive motor 19 rapidly.

Advantageously, the main drive motor 19 is operated directly from the source 56, which is an A.C. supply. Likewise, a motor 68 of the transfer arm actuator 48 is driven directly from the A.C. source 56, being controlled, however, by the cam actuated switch 54. The relay 60 and brake solenoid 67, on the other hand, advantageously are energized by a direct current source derived from a rectifier bridge 69, while the transfer solenoid 33 is also energized from a direct current source, from the battery 66.

To initiate the operation of the new apparatus, the mandrel 20 is assembled with a plurality of alternate cores 26 and transfer discs 27, the cores being circular in form, as shown in FIG. 5, or, if desired, irregular, as shown at 26' in FIG. 6. Wire from the supply S is threaded through the eye 43 and about the tension discs 40–42 and brought downward to be attached to the mandrel assembly at the first coil space which, in the illustrated form of the invention, is the coil space at the left hand end of the mandrel assembly 20.

Initially, the traverse table 32 is adjusted axially, relative to the mandrel assembly 20, until the line guide and tension device is aligned with substantial precision above the first coil space of the mandrel. That is, the plane of the discs 41–42 should be substantially coincident with the plane extending through the center of the first coil space, at right angles to the axis of the mandrel. Such initial adjustment of the traverse table 32 may be effected by any suitable means such as, for example, an adjusting screw 70 which enables the indexing solenoid 33 to be adjusted longitudinally along the base plate 11.

Rotation of the drive motor 19 is commenced with the control cams 52, 53 oriented in a predetermined initial position, so that the switches 54, 55 are actuated only after a predetermined number of rotations of the mandrel shaft 13. As the mandrel shaft rotates, wire is drawn under predetermined tension from the supply and is wound upon the coil core 26. The specific tension device used is particularly advantageous when, for example, the core is of irregular shape, since it enables the wire to be drawn at varying speeds, while retaining thereon a substantially constant tension.

As one of the important aspects of the invention, the initial adjustment of the support arm 37 is such that the line guide and tensioning device is located a substantial distance away from the mandrel assembly 20, in relation to the width of the coil spaces. As a result, the wire, in effect, emanates from an infinite distance, so that the convolutions of wire wound upon the coil core are laid down in a uniform and precise manner. By way of example, the free span of the wire W, between the tensioning device and the mandrel may be on the order of 20 inches, while the coil space may be on the order of 1/16 of an inch in width.

After a predetermined number of revolutions of the mandrel shaft 13, the control cams 52, 53 are rotated to positions in which the switches 54, 55 are closed. This simultaneously energizes the indexing solenoid 33, to index the traverse table 32 through the exact center-to-center distance between successive coil spaces, and energizes the motor 68 of the transfer arm actuator 48. Thus, the traverse table 32 is shifted to the right, as viewed in FIG. 1, and, simultaneously, the transfer arm 47 is pivoted clockwise. Advantageously, the transfer arm 47 is so positioned on the traverse table 32 that, when the arm is actuated to its operative position, the active portion 47a of the arm moves into the groove formed between adjacent walls of the coil space in which a coil has just been wound. In this respect, the transfer arm 47 is advantageously in the form of a wire whose diameter is somewhat greater than the width of the coil spaces. Accordingly, when the transfer arm is moved to operative position, the wire W is forced to the right, at a point adjacent the mandrel. During the next revolution of the mandrel, the wire is picked up by the inclined slot 30 of the adjacent transfer disc, and the wire is transformed to the next successive coil space. Rotation of the mandrel shaft 13 continues uninterrupted, and winding of the next successive coil is initiated immediately. Advantageously, the transfer arm actuator 48 is of a type which actuates momentarily and then returns to its initial position. Accordingly, after a few initial turns on a new coil, the transfer arm 47 returns to its initial position. Continued rotation of the mandrel shaft 13, of course, causes the control cams 52, 53 to continue to rotate, opening the switches 54, 55.

The above described sequence of operations repeats, with the apparatus unattended, until the last of a plurality of coils is wound. When the traverse blade 32 is subsequently indexed to the right, by the rotary solenoid 33, following the winding of the last coil, the end of the traverse table engages a limit switch 64, which opens to deenergize the relay 60 and shut off the apparatus.

The wound coils may be removed from the apparatus by backing off the live center 15 with the handwheel 29, and removing the mandrel assembly bodily, with the wound coils thereon. The mandrel may then be disassembled, by removing the end piece 22 from the threaded shaft or bolt 21 and sliding the cores and discs off of the shaft. The coils then formed are of the self-supporting type. It will be understood, however, that the coils may be wound on appropriate bobbins, if desired.

If desired, appropriate means may be provided to detect any breakage in the supply wire during winding and shut down the apparatus in response thereto. Such means may include the switch 65, to be opened in response to wire breakage to deenergize the relay 60.

The new apparatus has substantial advantages over known apparatus for winding small coils, in that a plurality of coils may be wound successively, in a substantially automatic manner and with continuous operation of the apparatus. The new apparatus thus permits mass production economies to be realized without, however, effecting any reduction in the high quality, precision characteristics of the coils. The substantial advantages of the new apparatus are realized in large part, it is believed, by the particular combination of the line guide means, movable relative to the winding mandrel and spaced a substantial distance therefrom in relation to the width of the coil spaces, with the transfer arm located adjacent the mandrel for effecting positive transfer of the wire from one coil space to another after a predetermined number of turns have been made in one coil space.

It should be understood, however, that the specific form of the invention herein illustrated and described is intended to be illustrative only, as certain changes may be made therein without departing from the clear teachings of the disclosure. Accordingly, reference should be made to the following appended claims, in determining the full scope of the invention.

We claim:

1. Apparatus for winding in sequence a plurality of coils of fine wire comprising, a mandrel mounted for rotation and having mounted thereon in alternating sequence a plurality of coil cores and transfer discs, means for rotating the mandrel continuously, wire guide means movable through a predetermined step-wise increment of movement equal to one coil space relative to said mandrel in accordance with rotations thereof to effect the successive transfer of said wire from one core to another during continuous rotation of said mandrel, said wire guide means being fixed during the winding of each successive coil space, said wire guide means including a wire guide spaced from said mandrel a substantial distance in relation to the coil space between transfer discs, said wire guide constituting the last effective means engaging the wire in advance of said mandrel during winding of each coil space, and movable wire transfer means having active and inactive positions, actuating means for moving said transfer means periodically and separately of said wire guide means into active positions immediately adjacent said mandrel to effect the transfer of the wire from one coil space to another, said actuating means moving said transfer means through a distance substantially greater than the predetermined increment of step-wise movement of said wire guide means, said wire transfer means being out of guiding contact with said wire when in an inactive position.

2. The apparatus of claim 1, in which said transfer means comprises a transfer arm, and said transfer arm has a portion movable upon completion of winding of one coil space toward the next successive coil space and into close proximity to a transfer disc between said coil spaces to urge the wire from one side to the other of said disc.

3. The apparatus of claim 2, which includes a movable traverse table mounting said wire guide means, and in which said transfer arm is movably mounted on said traverse table, said transfer arm being actuatable relative to said traverse table to active position substantially simultaneously with step-wise movements of said traverse table.

4. Apparatus for winding in sequence a plurality of coils of fine wire comprising in combination a mandrel mounted for rotation and having thereon a plurality of spaced transfer discs forming coil spaces, means for rotating the assembly of mandrel and discs, normally fixed wire guide means spaced radially of said mandrel a substantial distance in relation to the spacing between adjacent discs, said wire guide means constituting the last effective means engaging the wire in advance of said mandrel during winding of a coil space, actuating means operative periodically to move said mandrel and said guide means step-wise axially relative to each other to align said guide means successively with coil spaces between said transfer discs, and wire transfer means mounted in predetermined relation to said guide means and including a transfer arm movable relative to said wire guide means and having an operative position adjacent said mandrel and between said mandrel and guide means, means for actuating said transfer arm periodically for movement relative to said wire guide means to effect positive transfer of a wire from one side of a transfer disc to the other during continued rotation of said mandrel, said transfer arm being movable relative to said wire guide means through a distance substantially greater than one coil space, said transfer arm being retracted relative to said wire guide means to an inactive position out of contact with said wire during winding of individual coils in successive coil spaces.

5. The apparatus of claim 4, in which said transfer arm is mounted for pivoting movement between active and inactive positions and has a portion of generally circular cross-section, the diameter of said generally circular portion being greater than the coil spaces between transfer discs, and said generally circular portion being received partially in one of said spaces when said transfer arm is in its active position.

6. The apparatus of claim 5, in which said mandrel is mounted for rotation on a base, a traverse table is supported on said base for movement parallel to said mandrel, said guide and transfer means being mounted on said traverse table, and traverse drive means are provided for moving said table step-wise on said base to align said guide means successively with coil spaces of said mandrel.

References Cited in the file of this patent
UNITED STATES PATENTS

| | | |
|---|---|---|
| 345,208 | Behn | July 6, 1886 |
| 535,105 | Heath | Mar. 5, 1895 |
| 1,103,718 | West | July 14, 1914 |
| 1,976,514 | Pugh | Oct. 9, 1934 |
| 2,122,468 | Hill | July 5, 1938 |
| 2,122,485 | Nelson | July 5, 1938 |
| 2,296,339 | Daniels | Sept. 22, 1942 |
| 2,460,723 | Weesner | Feb. 1, 1949 |
| 2,597,375 | Rinehart | May 20, 1952 |
| 2,643,068 | Harris | June 23, 1953 |
| 2,846,156 | Flanagan | Aug. 5, 1958 |
| 2,930,536 | Stalhuth | Mar. 29, 1960 |